United States Patent [19]

Fechner et al.

[11] 4,117,101

[45] Sep. 26, 1978

[54] PROCESS FOR REDUCTION OF $SO_2$

[75] Inventors: Joachim Fechner, Hennef; Siegward Fiebig, Cologne-Auweiler; Friedrich Fischer, Lang-Göns; Herbert Fischer, Lollar; Lars Hellmer, Widdersdorf; Konrad Riedel, Cologne; Adolf Stauffer, Pulheim; Kuldip Sud, Weiden, all of Fed. Rep. of Germany

[73] Assignee: Davy Powergas GmbH, Fed. Rep. of Germany

[21] Appl. No.: 777,452

[22] Filed: Mar. 14, 1977

Related U.S. Application Data

[63] Continuation-in-part of Ser. No. 622,821, Oct. 16, 1975, abandoned, which is a continuation of Ser. No. 6 18,285, Sep. 30, 1975, abandoned.

[51] Int. Cl.² ............................................. C01B 17/04
[52] U.S. Cl. .................................. 423/569; 423/574 R

[58] Field of Search ................... 423/569, 570, 574 G, 423/576

[56] References Cited

PUBLICATIONS

"Chemical Abstracts," vol. 26, 1932, p. 2558.

*Primary Examiner*—G. O. Peters
*Attorney, Agent, or Firm*—Bernard & Brown

[57] ABSTRACT

Sulfur dioxide in sulfur dioxide-containing gases is thermally reduced at relatively moderate temperatures under reducing conditions provided by the incomplete combustion of hydrocarbon to produce elemental sulfur. Elemental sulfur can be recovered from the effluent gases from the thermal reduction and the effluent gases may be treated by conventional catalytic processes to recover additional elemental sulfur from the remaining sulfur values.

22 Claims, 1 Drawing Figure

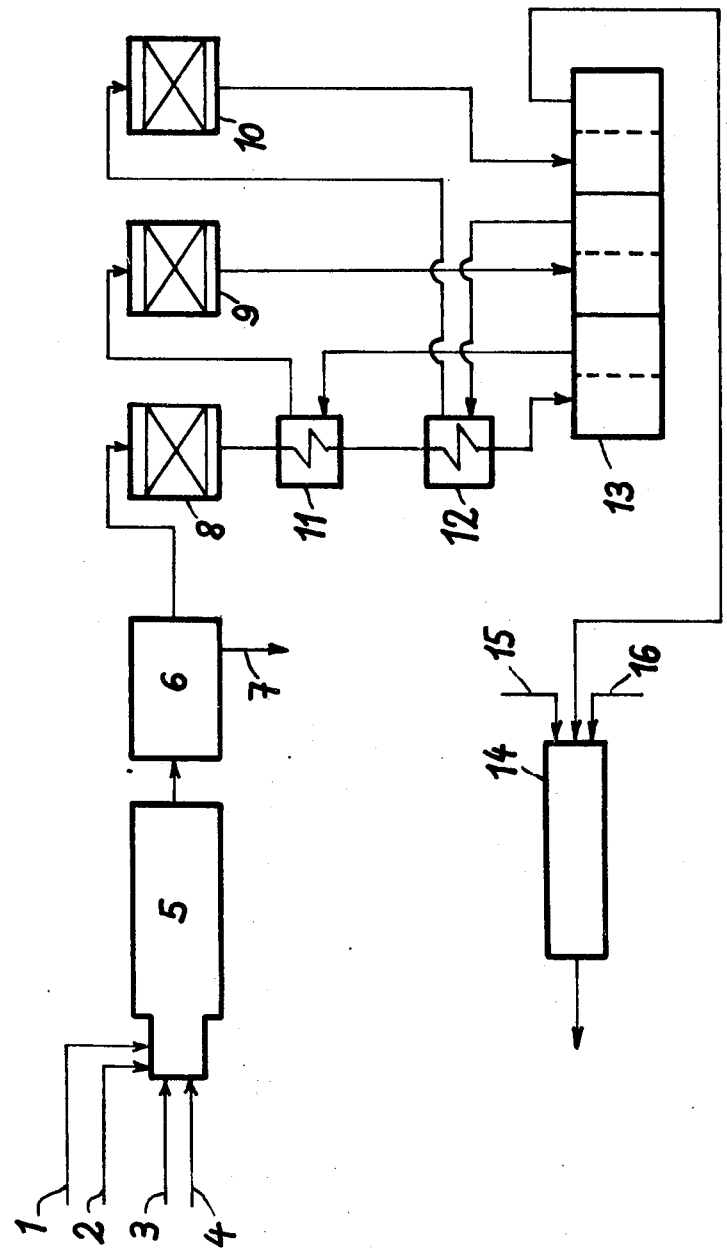

PROCESS FOR REDUCTION OF SO$_2$

This application is a continuation-in-part of application Ser. No. 622,821, filed Oct. 16, 1975, which in turn is a continuation of application Ser. No. 618,285, filed Sept. 30, 1975, both now abandoned.

This invention relates to a process for recovering elemental sulfur from sulfur dioxide-containing gases involving thermally reducing the sulfur-dioxide containing gases with hydrocarbon in the presence of an insufficient amount oxygen-containing gas for the complete combustion of the hydrocarbon to water and carbon dioxide to provide elemental sulfur.

Sulfur dioxide-containing gases are produced in a number of industrial processes, e.g., through the roasting of sulfide-containing ores or the combustion of sulfur-containing carbonaceous materials such as oil and coal. In operations such as the roasting of ores, the sulfur dioxide-containing gases have sufficient amounts of sulfur dioxide for processing into sulfuric acid and the efficiency of modern processes is sufficiently high that the exhaust gases from sulfuric acid processing units have only small amounts of sulfur dioxide. On the other hand, the combustion of sulfur-containing carbonaceous fuels provides an effluent having a sulfur dioxide content which is too low for direct utilization in sulfuric acid processing units, but yet too high for exhausting to the atmosphere. A number of processes are known for recovering sulfur dioxide from waste gas streams, e.g., flue gas from carbonaceous fuel combustion, which employ absorption or adsorption agents to recover the sulfur dioxide. These processes are cyclic in that the absorption or adsorption agents for the sulfur dioxide can be regenerated, resulting in the liberation of sulfur dioxide-containing gases, and the regenerated absorption or adsorption agents can be recycled to the sulfur dioxide recovery unit. The sulfur dioxide-containing gases evolved during regeneration generally have a much higher concentration of sulfur dioxide than that of the gas from which the sulfur dioxide was recovered. While such sulfur dioxide recovery processes may enable direct utilization of the gases evolved during regeneration in a sulfuric acid processing unit, sulfuric acid is generally not needed at the location at which the sulfur dioxide is recovered. It is therefore desirable to reduce the sulfur dioxide to elemental sulfur since sulfur can be stored and transported less expensively than sulfuric acid.

A number of processes are known for reducing sulfur-dioxide containing gases to elemental sulfur. One proposed process is disclosed in German patent application no. 2,327,616 and VGB-Kraftwerkstechnik 53, pages 521 to 525 (1973). The German patent application discloses the reduction of sulfur dioxide with methane in the presence of a reduction catalyst at a temperature of about 760° to 1000° C. The elementary sulfur which is formed, is separated from the gases and the gases are further catalytically processed in Claus units to provide elemental sulfur from sulfur dioxide and hydrogen sulfide. Since the catalytic reduction is performed at relatively high temperatures, damages to or losses of the reduction catalyst occur very readily. Moreover, to obtain the desired conversion of sulfur values to sulfur during reduction, the temperature must be precisely controlled.

In German patent application no. 2,365,116, a process for reducing sulfur dioxide-containing gases with hydrogen at temperatures above about 650° C. without the necessity of using a reduction catalyst is disclosed. The product gases from the reduction contain sulfur, hydrogen sulfide, sulfur dioxide and carbon disulfide. The hydrogen employed in this process must be relatively pure and can contain only small amounts of methane, and thus is relatively expensive. Suitable hydrogen-rich gases may be obtained through the catalytic reforming of natural gas.

In *Industrial Engineering and Chemistry*, Volume 42, pages 2249 to 2253 (1950), there is disclosed a process for reducing sulfur dioxide gases from a copper ore roaster with natural gas without employing a reduction catalyst. Temperatures above 1250° C. are employed to insure oxidation of carbon values in the natural gas and avoid obtaining a dark-colored sulfur product.

In accordance with the process of this invention, sulfur dioxide-containing gases are thermally reduced at relatively moderate temperatures for the most part to sulfur and hydrogen sulfide using a hydrocarbon, e.g., methane, as the reducing agent. The reducing agent is partially combusted with an oxygen-containing gas, for instance, air, i.e., an insufficient amount of free or molecular oxygen is provided on a stoichiometric basis for complete combustion of the hydrocarbon to carbon dioxide and water. The introduction of the sulfur dioxide-containing gases for reduction and the partial combustion of hydrocarbon may occur simultaneously in a thermal reduction chamber. For instance, elemental sulfur can be produced from sulfur dioxide-containing gases by a process which comprises combusting hydrocarbon, in the essential absence of sulfur dioxide-containing gases, with an oxygen-containing gas, in an insufficient amount on a stoichoimetric basis for complete combustion of the hydrocarbon, to provide a thermal reduction zone having reducing conditions for thermally reducing sulfur dioxide to elemental sulfur; introducing sulfur dioxide-containing gases into the thermal reduction zone downstream of the hydrocarbon combustion to thermally reduce the sulfur dioxide, in the relative absence of oxygen, and produce a reaction product containing elemental sulfur and sulfur compounds. The reaction product containing thermally-reduced gases may be cooled to about 200° to 460° C. and the sulfur values in the gases may be further processed, e.g., by catalytic conversion to elemental sulfur which may be condensed and separated from the gases. By the process of this invention, essentially carbon-free sulfur may be obtained while using relatively moderate temperatures.

Suitable sulfur dioxide-containing gases which may be employed in the process of this invention may contain about 10 to 100, preferably about 20 to 95, volume percent sulfur dioxide, and particularly advantageous sulfur dioxide-containing gases for use in this invention are those evolved from the regeneration of an absorbent or adsorbent employed in a sulfur dioxide recovery operation. The sulfur dioxide-containing gases are introduced into a thermal reduction zone and are subjected to thermal reduction conditions including a temperature generally in the range of about 950° to 1250° C., and preferably at about 1050° to 1100° C. The reduction temperatures are advantageously maintained by the combustion of hydrocarbon, e.g., gaseous hydrocarbon useable as fuel, with an insufficient amount of oxygen-containing gas for complete combustion of the hydrocarbon. The thermal reduction conditions advantageously include the use of uncombusted hydrocarbon which can pyrolize and produce a strong $SO_2$-reducing gas without the formation of undue amounts of elemental carbon. In one aspect, all of the hydrocarbon to be used as fuel for combustion and for reduction can be introduced in connection with the oxygen-containing gas to provide sufficient amounts of uncombusted hydrocarbon excess to reduce sulfur dioxide. In another aspect, the sulfur dioxide-containing gases and a first portion of the gaseous hydrocarbon may be introduced, e.g. expediantly blown, into the thermal reduction chamber and may be contacted with the combustion products of a second portion of hydrocarbon and oxygen-containing gas. About 50 to 80 percent of the sulfur content of the gases from the thermal reduction may be elemental sulfur. Sulfur dioxide and hydrogen sulfide may be present in the remaining sulfur values. These components may be present in a ratio of about 2 moles of sulfur dioxide per mole of hydrogen sulfide. By this invention it has been found that even though the hydrocarbon is combusted in the thermal reduction chamber at relatively moderate temperatures, the resultant, separated elemental sulfur product does not exhibit the dark coloring which would be expected if significant amounts of elemental carbon were present.

The partial combustion of hydrocarbon, e.g., gaseous hydrocarbon, provides products of incomplete combustion such as hydrogen and carbon monoxide. The thermal reduction proceeds with substantially the following reactions which proceed toward equilibrium:

$$CH_4 + O_2 \rightleftarrows CO + H_2 + H_2O$$

$$2 SO_2 + CH_4 \rightleftarrows 2/n\, S_n + CO_2 + 2 H_2O$$

$$SO_2 + 2 H_2 \rightleftarrows 2 H_2O + 1/n\, S_n$$

$$SO_2 + 2 CO \rightleftarrows 2 CO_2 + 1/n\, S_n$$

$$2 H_2S + SO_2 \rightleftarrows 3/n\, S_n + 2 H_2O$$

$$2 H_2 + S_2 \rightleftarrows 2 H_2S$$

$$CO_2 + H_2 \rightleftarrows H_2 + CO$$

$$2 CO + S_2 \rightleftarrows 2 COS$$

$$2 COS \rightleftarrows CO_2 + CS_2$$

The presence of carbon-containing compounds in the thermal reduction results, as illustrated above, in the formation of carbonyl sulfide and carbon disulfide. The formation of these compounds is not disadvantageous in the process of this invention since they may be readily converted by hydrolysis or hydrogenation to hydrogen sulfide.

In this aspect, the carbonyl sulfide or carbon disulfide-containing thermal reduction product is advantageously contacted under hydrogen sulfide-producing reaction conditions to convert carbonyl sulfide or carbon disulfide in the thermal reduction product to hydrogen sulfide. As noted previously, these conditions include temperatures generally ranging from about 200° to 460° C. and, preferably, the use of the hydrolysis or hydrogenation catalyst.

The hydrogen sulfide can conveniently be converted to elemental sulfur by, for instance, the Claus process. In any event, the formation of carbonyl sulfide and carbon disulfide serves to reduce the sulfur in sulfur dioxide.

According to a preferred embodiment of this invention, a portion of the hydrocarbon fed to the thermal reduction zone is combusted in the essential absence of the sulfur dioxide-containing gases, and the sulfur dioxide is then reduced in the essential absence of free or molecular oxygen. The portion of the hydrocarbon for combustion may conveniently be gaseous hydrocarbon such as natural gas, ethane, and the like, although other hydrocarbon fuels may be employed. A portion of hydrocarbon is then conveniently fed into the reduction chamber near, but separate from, the point of introduction of the sulfur dioxide-containing gases. This portion of the hydrocarbon undergoes pyrolysis and thus provides a relatively strong reducing gas without the formation of undue amounts of elemental carbon which in term, results in minimizing the prospect of producing dark colored sulfur. Preferably the hydrocarbon is vaporous at least at the conditions of the thermal reduction, and is preferably gaseous at room temperature and such hydrocarbons include natural gas, ethane, propane, and the like. The relatively strong reducing gas effectively reduces the relatively concentrated sulfur dioxide to the desired reduction products.

The sulfur dioxide-containing gases are preferably introduced into the thermal reduction chamber downstream from the combustion of the vaporous hydrocarbon, and more preferably, downstream from the point of introduction of the portion of the hydrocarbon which undergoes pyrolysis to provide a strong reducing gas. In this manner, the gases contacting the sulfur dioxide-containing gases are relatively free from free or molecular oxygen, for instance, the gases contacting the sulfur dioxide may contain less than about 0.2 volume percent of free oxygen. The reduction chamber is expediantly supplied with about 10 to 50 percent of the free or molecular oxygen required for complete combustion of the total hydrocarbon to carbon dioxide and water.

In accordance with a preferred embodiment of this invention, it is desirable that (advantageous if) the sulfur dioxide-containing gases introduced into the thermal reduction chamber contain elemental carbon-inhibiting amounts of water and these amounts can range from about 5 or 15 to 75 or 80 volume percent water vapor, or steam. It has been found that in the process of this invention, water concentrations in the sulfur dioxide-containing gases contribute to the inhibition of the formation of elemental carbon. Thus, the gases leaving the thermal reduction chamber are relatively free from elemental carbon, i.e., soot, and bright, substantially carbon-free sulfur may be recovered downstream of the thermal reduction zone by condensing sulfur from the effluent gases.

The reduction of sulfur dioxide may be accelerated and facilitated by the addition of hydrogen-containing and/or carbon monoxide-containing gases, for instance, town gas, to the thermal reduction chamber. The addition of gases righ in hydrogen and/or from about monoxide in addition with the hydrocarbon which undergoes pyrolysis to provide a strong reducing gas, may not only accelerate the reduction of sulfur dioxide found that also may affect the hydrogen sulfide to sulfur dioxide ratio of the gases exiting the reduction chamber in that generally the greater the amount of hydrogen provided, the greater the ratio of hydrogen sulfide to sulfur dioxide. The ratio of hydrogen sulfide to sulfur dioxide may thusly be adjusted to provide a convenient ratio for conversion by downstream processing of remaining sulfur values to elemental sulfur by, for instance, the Claus process. In an aspect of the invention, the hydrocarbon-containing gas which is introduced into the thermal reduction chamber is coke-oven gas substantially containing methane, hydrogen, and carbon monoxide.

The gas leaving the thermal combustion chamber may contain, among other components, carbonyl sulfide and carbon disulfide. These components are desirably catalytically hydrogenated and/or hydrolyzed to provide hydrogen sulfide which in turn may be converted with sulfur dioxide to elemental sulfur in accordance with the Claus process. Generally, sufficient water vapor and hydrogen are present in the gases exiting the thermal reduction chamber for the hydrogenation or hydrolysis of these compounds. The conversions of the carbonyl sulfide and carbon disulfide may proceed in accordance with the following reactions at temperatures in the range of about 250° to 450° C. over a suitable hydrogenation and hydrolysis catalyst, for instance, a cobalt/molebdenum on bauxite catalyst:

$$COS + H_2O \rightleftarrows CO_2 = H_2S$$

$$COS + H_2 \rightleftarrows CO + H_2S$$

$$CS_2 + 2 H_2O \rightleftarrows CO_2 + 2 H_2S$$

Under these hydrogenation and hydrolysis conditions, a significant amount of the hydrogen sulfide and sulfur dioxide will be converted to elemental sulfur in accordance with the well known Claus process. In view of the lower temperatures desired in the downstream processing of the gases exiting from the thermal reduction chamber, the gases may conveniently be cooled in a waste-heat boiler to an acceptable temperature for further processing. The separation of elemental sulfur may occur during cooling in the waste heat boiler since the gases from the thermal reduction chamber may contain considerable amounts of elemental sulfur.

It is desirable to employ at least one, and preferably two, subsequent processing stages, e.g. Claus processing stages, for treating the gases from the thermal reduction chamber to recover additional sulfur from any remaining hydrogen sulfide and sulfur dioxide contained therein. The Claus processing units may be conventional and frequently the catalytic conversion is at a temperature of about 200° to 230° C. using a bauxite-containing catalyst. Desirably, the gases from each Claus catalytic conversion stage are cooled to a temperature in the range of about 125° to 160° C., preferably about 130° to 140° C., to condense elemental sulfur, and the condensed elemental sulfur is separated from the gases.

The gases from the final Claus catalytic conversion stage may be cooled and the elemental sulfur separated. The effluent gases from the sulfur separation may be combusted in an after-burner to convert the sulfur values contained therein to sulfur dioxide. The exhaust gases containing sulfur dioxide may conveniently in part be admixed with the sulfur dioxide-containing gases fed to the thermal reduction zone, or they may be delivered to a sulfur dioxide recovery unit for recovery of sulfur dioxide. The latter procedure is particularly attractive when the process of this invention is used in conjunction with a sulfur dioxide recovery unit. Frequently, the gases exiting the after-burner may contain only about 0.6 to 0.9 volume percent sulfur dioxide.

The invention may be further understood by reference to the drawing which is a schematic flow diagram of the process of this invention.

Sulfur dioxide-containing gas from which sulfur is to be recovered is supplied to thermal reduction chamber 5 by line 1. The sulfur dioxide-containing gas may, for instance, be obtained from a cyclic sulfur dioxide recovery unit wherein sulfur dioxide is removed from waste gases by a suitable absorption or adsorption agent, the absorption or adsorption agent containing the recovered sulfur dioxide is regenerated by desorbing the sulfur dioxide, and the regenerated absorption or adsorption agent is returned for further recovering of sulfur dioxide from waste gases. Vaporous hydrocarbon, e.g., methane, is supplied by line 2 to the reduction chamber 5. As the sulfur dioxide-containing gas and vaporous hydrocarbon are being fed to the reduction chamber, a burner in the reduction chamber is being provided with vaporous hydrocarbon, e.g., methane, from line 3 and oxygen-containing gas, e.g., air, from line 4. The effluent from the burner passes through the thermal reduction chamber in association with the sulfur dioxide-containing gas and the vaporous hydrocarbon from line 2. In the thermal reduction chamber the sulfur dioxide is reduced, for the most part, to elemental sulfur and hydrogen sulfide. The gas may also contain carbonyl sulfide, carbon disulfide, and sulfur dioxide. The gas mixture leaving the thermal reduction chamber 5 is passed to and cooled in waste heat boiler 6 to provide an effluent gas having a suitable temperature for catalytic conversion of remaining sulfur values in the gas to elemental sulfur. The cooling in waste heat boiler 6 may provide the coalescing of elementary sulfur, and line 7 is provided to withdraw liquid sulfur which may be separated from the waste heat boiler.

The cooled gases from the waste heat boiler pass to first catalytic converter 8 and the carbonyl sulfide and carbon disulfide are reacted with water vapor and molecular hydrogen which are present in the gas as a result of the reduction reaction in thermal reduction chamber 5, to provide hydrogen sulfide which in turn reacts with sulfur dioxide to provide elemental sulfur. The gases are withdrawn from catalytic converter 8 and are cooled in heat exchangers 11 and 12 to a temperature sufficiently low to condense sulfur, i.e., generally to a temperature less than about 160° C. The condensed sulfur is separated from the gases and collected in a first chamber of separator 13. The gases from the first chamber of the separator are used as the cooling medium in heat exchanger 11 and are heated to a temperature suitable for the subsequent catalytic conversion of sulfur dioxide and hydrogen sulfide to elemental sulfur in second catalytic converter 9. The elemental sulfur in the gases exiting the second catalytic converter is separated in the second chamber of separator 13. If the gases passing to the second chamber are too warm to permit the condensation of elemental sulfur in the separator, the gases may be cooled by indirect heat exchange to a suitable temperature prior to entering the separator. The gases from the second chamber of separator 13 are reheated in heat exchanger 12 while serving as the cooling medium therein, and then are passed to final catalytic convertor 10 for the conversion of sulfur dioxide and hydrogen sulfide to provide elemental sulfur. The gases from the final catalytic convertor are cooled, if necessary to provide for the condensation of elemental sulfur, and passed to the third chamber of separator 13 to remove condensed elemental sulfur therefrom. The exhaust gases from the separator enter after-burner 14 to eliminate combustible components from the exhaust gases such as hydrogen sulfide and elemental sulfur. Hydrocarbon fuel, e.g., methane, and oxygen-containing gas, e.g., air, are supplied to the after-burner by lines 15 and 16, respectively, to provide heat and sufficient oxygen to effect the oxidation of combustible sulfur components. The exhaust gases from the after-burner may, for example, contain only about 0.6 to 0.9 volume percent sulfur dioxide, and may conveniently be supplied with the waste sulfur dioxide-containing gas to the sulfur dioxide recovery unit.

While the gaseous effluent from the first and second chambers of separator 13 are illustrated as being heated to suitable temperatures for the subsequent catalytic conversions in the heat exchangers, additional heating may be desirable, or alternatively another cooling medium is employed instead of the gases from the separator, and the heat may be provided by, for instance, direct heat exchange with a gas burner positioned within the pipe. Suitable burners include burners which combust methane, natural gas, or other heating gas with a supplemental oxygen-containing gas.

The following example is illustrative of this invention. All parts and percentages are by weight unless otherwise indicated.

EXAMPLE I

A sulfur dioxide-containing gas is obtained from a sulfur dioxide recovery unit. In the sulfur dioxide recovery unit, an effluent from a carbonaceous fuel combustion is contacted with coke which is activated to absorb sulfur dioxide. The coke having the adsorbed sulfur dioxide is heated to liberate sulfur dioxide-containing gases and regenerate the coke for further contact with the combustion effluent. The sulfur dioxide-containing gases contain about 21 volume percent sulfur dioxide. Elemental sulfur is recovered from the sulfur dioxide-containing gases in accordance with the process as outlined with respect to the drawing, and this example will therefore be described with reference to the drawing and its description.

The sulfur dioxide-containing gases are fed via line 1 into thermal reduction chamber 5 at a rate of 2920Nm$^3$/h with 1235Nm$^3$/h of coke-oven gas. The temperature in the reduction chamber is maintained at about 950° to 1000° C. through combustion of coke oven gas with air supplied to the burner through lines 3 and 4, and coke oven gas is also supplied to the thermal reduction chamber via line 2. Sulfur dioxide in the sulfur dioxide-containing gases is reduced, thereby providing effluent gases containing elemental sulfur and hydrogen sulfide. The gases leaving the thermal reduction chamber are cooled to about 300° C. in waste heat boiler 6 and thereby provide gases having a suitable temperature for catalytic conversion of the remaining sulfur values to elemental sulfur. The cooled gases are passed to the first catalytic converter 8 in which a cobalt/molebdenum supported on bauxite catalyst is employed. The catalytic conversion proceeds at about 325° C. The effluent from the first catalytic converter is cooled in two stages to 150° and 135° C. in heat exchangers 11 and 12, and elemental sulfur is separated from the gases in the first chamber of separator 13. The gases are then treated in the second catalytic converter 9 also employing a Claus catalyst at a temperature of about 240° C., cooled to 135° C., and elemental sulfur is recovered therefrom in the second chamber of separator 13. The gases from the second chamber are passed to the final catalytic converter 10 also employing a Claus catalyst and the catalytic conversion proceeds at about 210° C. The effluent from the final catalytic converter is cooled to 135° C. and passes to the third chamber of separator 13 to separate elemental sulfur therefrom. As described in the drawing, the gaseous effluent from the third chamber of separator 13 is treated in the after-burner 14. The yield is 810 kilograms per hour of elemental sulfur having a bright color. The sulfur product is analyzed to be about 99.95 percent pure.

EXAMPLE II

The process of Example I is essentially followed except, instead of introducing coke oven gas in lines 2 and 3, all of the coke oven gas is introduced in line 3 and the uncombusted excess of the coke oven gas is contacted with the sulfur dioxide gas downstream of the combustion to thermally reduce sulfur dioxide.

EXAMPLE III

An indirectly heatable reaction tube was fitted with a burner at its end for additional direct heating. It was also provided with a water vaporizer, for producing a gas containing SO$_2$ with a high water vapor content, as is yielded in the case of regeneration of absorbents with water vapor-containing gases used for desulfurization of flue gas. The gas components were dosed using a suitable flow meter, and the gas volume after passing through the reaction tube was measured by a gas meter. The high temperature zone of the oven was 40 cm long.

The oven was loaded with 150.0 Nl/h SO$_2$ gas, 54.4 Nl/h reducing gas, 14.3 Nl/h combustible gas and 60.0 Nl/h air, for a total of 278.7 Nl/h gas. The SO$_2$ gas consisted of 21.0 percent by volume SO$_2$, 10.0 percent by volume CO$_2$ and 69.0 percent by volume H$_2$O. The reducing gas consisted of 68.1 percent by volume H$_2$, 5.7 percent by volume CO, 23.4 percent by volume CH$_4$ and 2.8 percent by volume higher hydrocarbons, consisting of ethylene, ethane, propane and butane. The combustible gas consisted of 69.9 percent by volume H$_2$, 6.3 percent by volume CO and 23.8 percent by volume CH$_4$.

The reaction temperature was 1,060° C. maximum, the period of dwell about 2.2 s. The conversion of the sulfur dioxide to sulfur and hydrogen sulfide was 80%.

It is claimed:

1. A process for producing essentially carbon-free elemental sulfur from sulfur dioxide-containing gases having at least about 10 volume percent sulfur dioxide by thermal reduction using relatively moderate temperatures which comprises combusting hydrocarbon, in the essential absence of sulfur dioxide-containing gases, with an oxygen-containing gas, in an insufficient amount on a stoichiometric basis for complete combustion of the hydrocarbon, to provide a thermal reduction zone having reducing conditions including temperatures from about 950° to 1250° C. and pyrolysis of hydrocarbon to provide SO$_2$-reducing gas for thermally reducing sulfur dioxide to elemental sulfur; introducing the sulfur dioxide-containing gases into the thermal reduction zone downstream of the hydrocarbon combustion to thermally reduce the sulfur dioxide, with SO$_2$-reducing gas, in the relative absence of oxygen, and produce a reaction product containing elemental sulfur and sulfur compounds including carbonyl sulfide or carbon disulfide; catalytically contacting the reaction product under hydrogen sulfide-producing conditions including a temperature of about 200° to 460° C. to convert carbonyl sulfide or carbon disulfide to hydrogen sulfide which can be converted to additional amounts of elemental sulfur; and recovering elemental sulfur.

2. A process for producing essentially carbon-free elemental sulfur from sulfur dioxide-containing gases having at least about 10 volume percent sulfur dioxide and obtained from the regeneration of an absorbent or adsorbent used in the recovery of $SO_2$ from gases by thermal reduction using relatively moderate temperatures which comprises combusting hydrocarbon, in the essential absence of sulfur dioxide-containing gases, with an oxygen-containing gas, in an insufficient amount on a stoichiometric basis for complete combustion of the hydrocarbon, to provide a thermal reduction zone having reducing conditions, including temperatures from about 950° to 1250° C. and pyrolysis of hydrocarbon to provide $SO_2$-reducing gas, for thermally reducing sulfur dioxide to elemental sulfur; introducing the sulfur dioxide-containing gases into the thermal reduction zone downstream of the hydrocarbon combustion to thermally reduce the sulfur dioxide with $SO_2$-reducing gas, in the presence of elemental carbon-inhibiting amounts of water and in the relative absence of oxygen, and produce a reaction product containing elemental sulfur and sulfur compounds; catalytically contacting the reaction product under hydrogen sulfide-producing conditions including a temperature of about 200° to 460° C. to convert carbonyl sulfide or carbon disulfide to hydrogen sulfide which can be converted to additional amounts of elemental sulfur; and recovering elemental sulfur.

3. The process of claim 2 wherein the sulfur dioxide containing gases and a portion of the hydrocarbon are introduced into the thermal reduction zone and are contacted with the combustion products of another portion of hydrocarbon and oxygen-containing gas.

4. The process of claim 3 wherein the hydrocarbon is gaseous hydrocarbon and elemental sulfur is separated from the reaction product before the product is subjected to the catalytic contact.

5. The process of claim 4 wherein the hydrocarbon is coke-oven gas.

6. The process of claim 4 wherein the reduction of sulffur dioxide is accelerated by the addition of hydrogen-containing or carbon monoxide-containing gas.

7. The process of claim 6 wherein the hydrogen-containing or carbon monoxide-containing gas is used in an amount to provide a greater ratio of hydrogen sulfide to sulfur dioxide in the reaction product.

8. The process of claim 7 wherein town gas is used for the hydrogen-containing or carbon monoxide-containing gas.

9. The process of claim 4 wherein the thermal reduction of sulfur dioxide is conducted in the presence of less than about 0.2 volume percent oxygen.

10. The process of claim 9 wherein the sulfur dioxide-containing gases comprise about 5 to 80 volume percent water.

11. The process of claim 2 wherein the sulfur dioxide-containing gases are evolved from the regeneration of an absorbent or adsorbent employed in a sulfur dioxide recovery unit.

12. The process of claim 4 wherein the gaseous hydrocarbon is methane; the oxygen-containing gas is air; the reaction product is cooled to condense elemental sulfur which is separated and contains thermally reduced gases comprising sulfur dioxide and hydrogen sulfide; and the thermally reduced gases are contacted with a catalyst at a temperature of about 200° to 460° C. in a separate reaction zone to produce more elemental sulfur.

13. The process of claim 12 wherein the thermally reduced gases additionally comprise carbonyl sulfide, carbon disulfide, water vapor and hydrogen, and are contacted with hydrogenation and hydrolysis catalyst at 200° to 460° C. to produce hydrogen sulfide.

14. The process of claim 13 wherein the hydrogenation and hydrolysis catalyst comprises cobalt and molybdenum on bauxite and also catalytically converts sulfur dioxide and hydrogen sulfide to elemental sulfur.

15. The process of claim 14 wherein the gases after contacting the hydrogenation and hydrolysis catalyst are contacted in at least one separate reaction zone with a catalyst to provide elemental sulfur.

16. The process of claim 15 wherein after each catalytic reaction zone, the gases are cooled to a temperature in the range of 125° to 160° C. and elemental sulfur is condensed and separated from the gases.

17. The process of claim 9 wherein the sulfur dioxide-containing gases contain about 20 to 95 volume percent sulfur dioxide.

18. The process of claim 4 wherein the reducing conditions include temperatures at about 1050° to 1100° C.

19. The process of claim 4 wherein the oxygen-containing gas provides about 10 to 50 percent of the oxygen required for the complete combustion of total hydrocarbon.

20. In the process for recovering sulfur dioxide produced by combustion of sulfur-containing carbonaceous materials wherein a sorption agent is regenerated to provide a gaseous stream containing at least 10 vol. % $SO_2$ sulfur values; the improvement which comprises:

oxidizing a gaseous hydrocarbon by incomplete combustion with an oxygen-containing gas, wherein the amount of free oxygen is about 10 to 50% of the stoichiometric amount necessary for total combustion of the hydrocarbon to carbon dioxide and water, thereby providing a hot reducing gas stream containing carbon monoxide, hydrogen, not moe than 0.2 vol. % $O_2$, and essentially free of elemental carbon;

contacting the $SO_2$-containing stream with the reducing gas stream at a reaction temperature of about 950° to 1250° C under thermal reducing conditions to convert $SO_2$ to a reaction product stream containing elemental sulfur and reduced sulfur compounds;

contacting the reaction product stream at about 200° to 460° C with a catalyst to convert the COS and $CS_2$ to $H_2S$;

reacting $H_2S$ with remaining $SO_2$ to produce elemental sulfur; and recovering substantially all of the sulfur values as pure elemental sulfur substantially free of elemental carbon.

21. The method of claim 20 wherein the reduced sulfur compounds in the reaction product stream comprise COS and $CS_2$.

22. The method of claim 20 wherein the $SO_2$-containing gas contains sufficient water vapor to inhibit free carbon formation; and wherein the reduction of $SO_2$ is accelerated by addition of $H_2$-containing gas or CO-containing gas in amount to provide a ratio of $H_2S$ to $SO_2$ for Claus reaction.

* * * * *

UNITED STATES PATENT OFFICE
CERTIFICATE OF CORRECTION

Patent No. 4,117,101   Dated September 26, 1978

Inventor(s) Joachim Fechner et al.

It is certified that error appears in the above-identified patent and that said Letters Patent are hereby corrected as shown below:

Column 4, line 61, delete "found that" and insert --but--.
Claim 19, line 4, following "drocarbon" insert --introduced into the thermal reduction zone--.
Column 1, line 12, after "amount" insert --of--.
Column 1, line 57, delete "elementary" and insert --elemental--.
Column 1, line 62, delete "damages" and insert --damage--.

Column 3, line 1, delete "pyrolize" and insert --pyrolyze--.
Column 3, line 27, after "monoxide" insert --according to the reaction $CH_4 + O_2 \rightleftharpoons CO + H_2 + H_2O$--.
Column 3, line 30, delete entire line.

Column 4, line 57, delete "righ" and insert "rich--.
Column 5, line 6, delete "combustion" and insert --reduction--.
Column 5, line 11, before "with" insert --by reaction--.
Column 5, line 22, delete "=" and insert --+--.

Signed and Sealed this

Seventh Day of August 1979

[SEAL]

Attest:

LUTRELLE F. PARKER

Attesting Officer   Acting Commissioner of Patents and Trademarks